United States Patent
Willems

(10) Patent No.: US 7,325,281 B1
(45) Date of Patent: Feb. 5, 2008

(54) SECURITY STRAP

(76) Inventor: George Lee Willems, 3 Saluda Rd., Williamston, SC (US) 29697

( * ) Notice: Subject to any disclaimer, the term of this patent is extended or adjusted under 35 U.S.C. 154(b) by 3 days.

(21) Appl. No.: 11/492,240

(22) Filed: Jul. 25, 2006

(51) Int. Cl.
E05C 19/18 (2006.01)
A44B 21/00 (2006.01)

(52) U.S. Cl. ..................... 24/302; 292/259 R
(58) Field of Classification Search ............... 24/298, 24/302; 292/259 R, 253, DIG. 16; 70/93; 280/808, 801.1
See application file for complete search history.

(56) References Cited

U.S. PATENT DOCUMENTS

| | | |
|---|---|---|
| 641,785 A | 1/1900 | MacCormac |
| 896,244 A | 8/1908 | Reesor |
| 1,112,123 A | 9/1914 | Dow |
| 1,320,832 A | 11/1919 | Bourque |
| 1,433,793 A | 10/1922 | Carr |
| 1,496,885 A | 6/1924 | Jones |
| 1,835,100 A | 12/1931 | Symington |
| 1,919,328 A | 7/1933 | Hansen |
| 1,952,112 A | 3/1934 | Bartsch |
| 2,343,564 A | 3/1944 | Mackey |
| 2,352,618 A | 7/1944 | Daenz |
| 2,374,898 A | 5/1945 | Rossiter |
| 2,578,397 A | 12/1951 | Brown |
| 2,627,950 A | 2/1953 | Dath |
| 2,665,143 A * | 1/1954 | Rasmussen ............... 280/801.1 |
| 2,799,322 A * | 7/1957 | Jordan ........................ 297/254 |
| 2,814,336 A * | 11/1957 | Manhart et al. ............ 297/468 |
| 2,869,911 A | 1/1959 | Dickey et al. |
| 2,895,199 A | 7/1959 | Jones |
| 2,983,413 A * | 5/1961 | Verwers ..................... 224/318 |
| 3,164,409 A * | 1/1965 | Rumble ...................... 280/807 |
| 3,188,600 A | 6/1965 | Woofter et al. |
| 3,198,544 A * | 8/1965 | Presuuka ................. 280/801.1 |
| 3,366,433 A | 1/1968 | Cann |
| 4,006,471 A | 2/1977 | Pappas |
| 4,093,287 A | 6/1978 | Canter |
| 4,118,057 A | 10/1978 | Ryan |
| 4,295,761 A | 10/1981 | Hansen |
| 4,616,953 A | 10/1986 | Gomes |
| 4,690,444 A | 9/1987 | Arthur |
| 4,709,840 A * | 12/1987 | Allen ......................... 224/314 |
| 4,953,903 A * | 9/1990 | Warner ....................... 294/1.1 |
| 5,423,644 A * | 6/1995 | First, Sr. ..................... 410/100 |
| 5,809,620 A * | 9/1998 | Crowley et al. ............. 24/302 |
| 6,619,708 B1 * | 9/2003 | Naylor ................... 292/259 R |

* cited by examiner

Primary Examiner—Robert J. Sandy
(74) Attorney, Agent, or Firm—McNair Law Firm, P.A.

(57) ABSTRACT

Apparatus and method of securing opposed doors of a motor vehicle in closed positions which includes:
providing each door has an arm rest forming an opening between the inside of the door and the arm rest;
providing an elongated strap member and engaging the elongated strap member with each arm rest;
drawing the elongate strap member taut and fixing it in the taut condition securing the doors in the closed position.

5 Claims, 2 Drawing Sheets

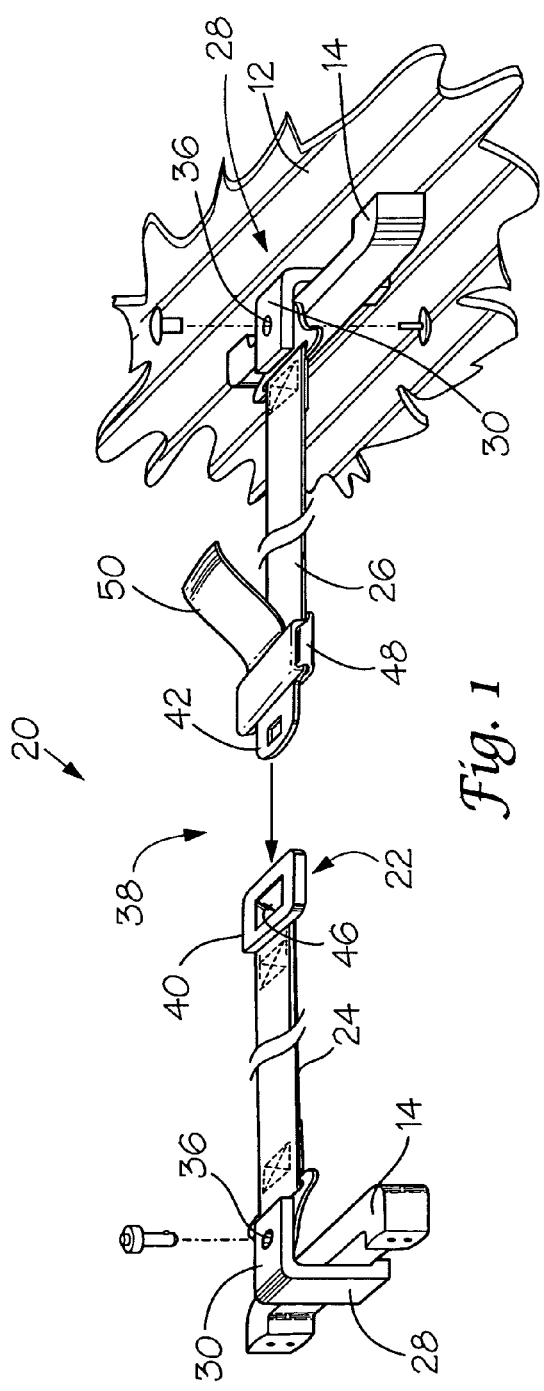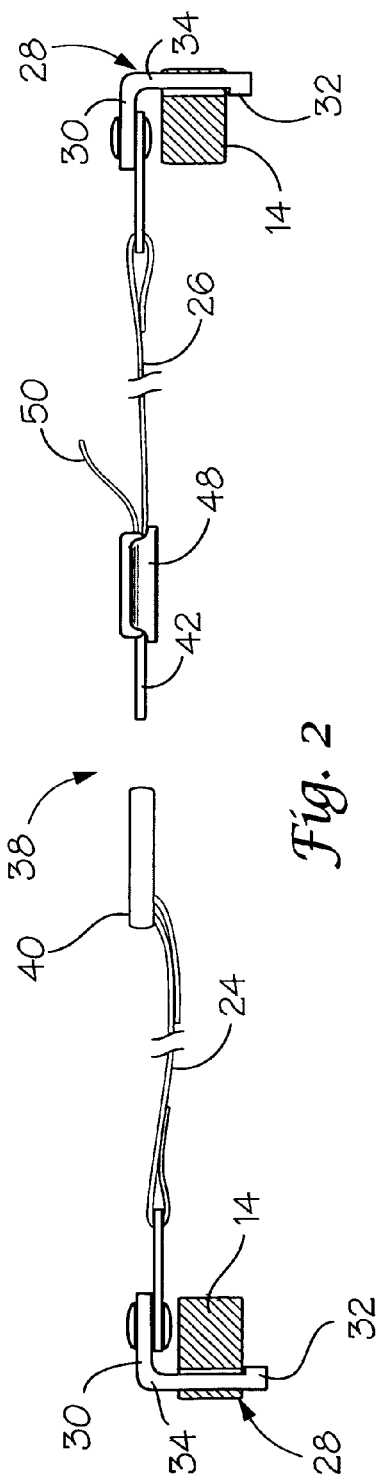

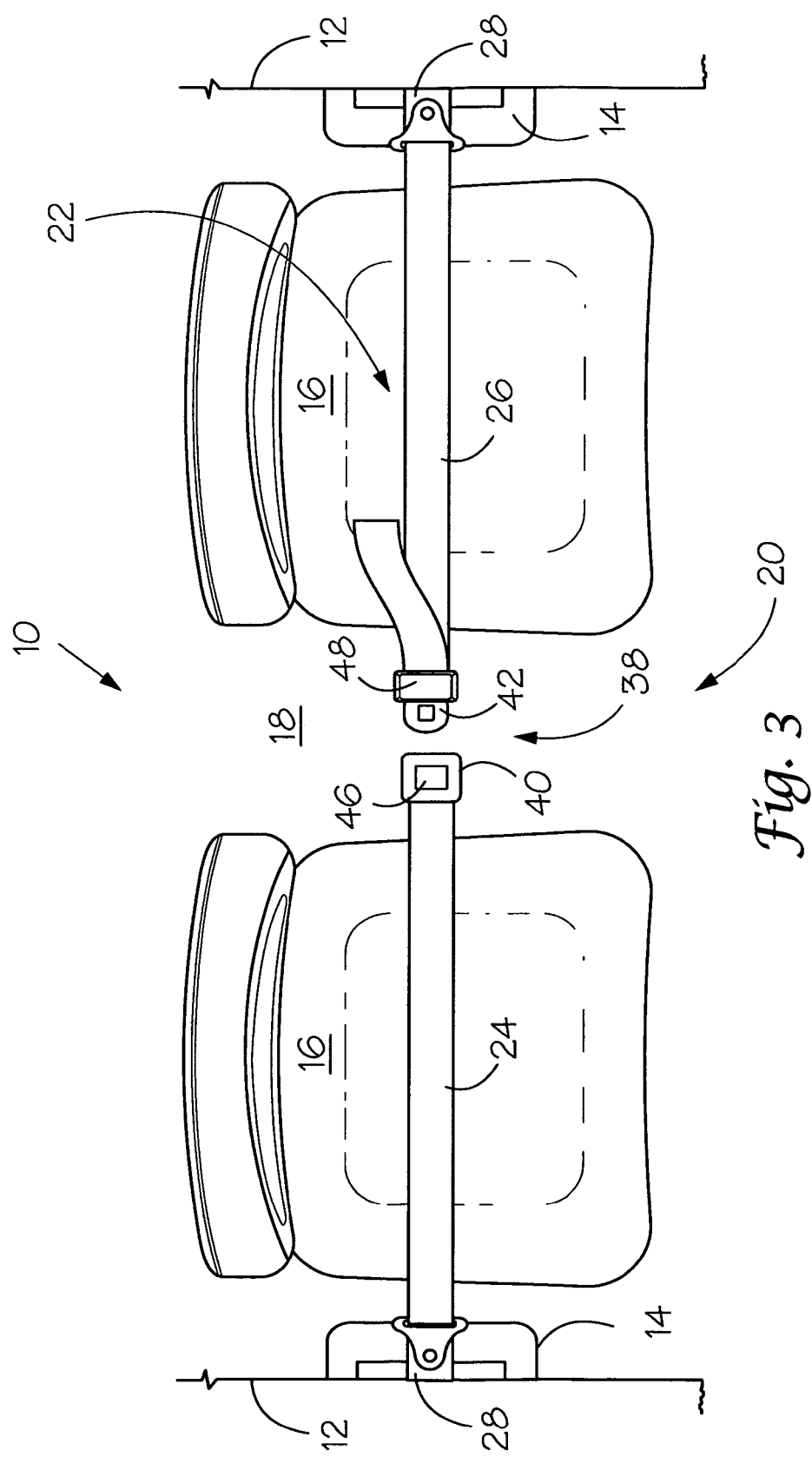

SECURITY STRAP

BACKGROUND OF THE INVENTION

Overnight truckers spend many nights, or at least portions thereof, parked in rest stops while they sleep in the cab or sleeper of the truck. It is well-known that the door locks for these cabs or sleepers are not very reliable, leaving the driver vulnerable to break-in and robbery.

The primary object of this invention is the provision of a security device operable from inside the cab of the truck to lock or secure the cab or sleeper doors in the closed position.

Another object of the invention is to provide a security device which is not accessible from outside the cab of the truck.

Another object of the invention is the provision of a security device which is easy to operate while being inexpensive.

Another object of the invention is the provision of a security device which is easily stored when not in use.

Another object of the invention is the provision of a fail-safe security device for motor vehicle cabs or passenger compartments.

SUMMARY OF THE INVENTION

The instant invention is directed to a security device for use with motor vehicles for securing the opposed doors of the cab or passenger compartment from the inside. The doors include arm rests secured with the inner sides thereof. The security device includes a pair of elongated straps each having an arm rest engaging member at a first end and a releasable buckle at a second end. An adjustment clamp is associated with the buckle and one of the straps. In use, each arm rest engaging member is releasably positioned between the arm rest and the inner side of the associated door with the pair of straps extending inwardly so that their second ends are in adjacent opposed positions. The adjustment clamp allows the second ends to position the buckle in position to be engaged with the straps drawn taut. When the buckle is engaged the opposed doors are locked in the closed position.

The buckle is of a known construction and includes a releasable clasp connected with the second end of the first of the straps and an engageable projection connected with the second end of the second of the straps. The adjustment clamp is associated with the projection and the second end of the second strap. The projection is operative to be engaged in the clasp when the buckle is in its engaged position. In this position, the pair of straps are formed as continuous between the doors. The clasp is also operative to release the projection which then permits the projection to be separated from the clasp allowing the strap ends to be moved into spaced position.

The arm rest engaging members are comprised of a generally J-shaped member with spaced parallel upper and lower extensions or members interconnected with a generally perpendicular extending member or arm. In their operative or engaged positions, the perpendicular members are passed through the opening and engage with the arm rest portion opposite the inner side of the opposed doors. The upper extension of each arm rest engaging member is positioned on an upper side of the associated arm rest and each lower extension is positioned on a lower side of the arm rest. The upper extensions are also secured with the first end of the straps. The arm rest engaging members preferably are constructed of a substantially rigid core material covered with a resilient coating or cover.

The adjustment clamp is of usual construction and connects the second end of the second strap with the projection. The adjustment clasp allows lengthwise movement of the second end of the second strap relative to the adjustment clamp and the projection to lengthen or shorten the associated strap.

The invention includes the method of securing opposed doors of a motor vehicle in closed positions in the following manner. Providing that each door has an arm rest which forms an opening between the door and the arm rest. Providing an elongated strap member and engaging the elongated strap member with each of the arm rest. Drawing the elongate strap member taut while engaged with the arm rests. Fixing the elongate strap member in the taut condition, thus securing the doors in the closed position.

The method further includes moving the strap member through the opening when engaging the strap member with the arm rest.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a sectional perspective view of the safety strap of the invention.

FIG. 2 is a sectional side view of the safety strap of the invention.

FIG. 3 is a top sectional view of opposed door section with arm rest engaged by the safety device of the invention.

DESCRIPTION OF A PREFERRED EMBODIMENT

Referring now in more detail to the drawings, the invention will be described in more detail.

Long-haul or overnight tractors or trucks are generally on the road for several days hauling and delivering product. Because of the expense and for convenience, the drivers many times spend rest or sleep periods in rest areas along the highways. In some instances, these rest areas are not in desirable locations and conditions may not be as safe as would be desired.

The instant invention has as its object to provide a device which is operative to further secure the interior of the truck cab against break-in and thus, provide the driver with a greater feeling of security.

Turning now to the drawings, a section of the interior of the cab of a truck is shown at 10. The interior section includes a pair of spaced door interior surfaces 12, each having an arm rest 14 secured thereto and arranged in opposed positions on opposite sides of the cab. Generally the cab includes a pair of spaced seats 16 which form a gap 18 therebetween. Normally, there is a sleeper area located behind the seats. The gap provides an access for the driver to move between the cab and the sleeper.

This arrangement is merely the usual arrangement and in no way limits the invention to use with only this type of cab arrangement, or for that matter, with only trucks.

The safety device of the invention is generally shown at 20. It comprises a belt 22 which consists of a first strap 24 and a second strap 26. Belt 22 is preferably of the strap material used in automobiles and other vehicles with seat belts. Seat belt straps are generally woven of synthetic material, usually nylon, and are constructed to provide the greatest strength and wearability. Any usual construction is acceptable.

A pair of arm rest engaging members 28 are secured with first ends of each strap 24, 26. Each engaging member 28 is of generally J-shaped configuration to include parallel spaced arms or extensions 30, 32 and a connector 34 which is generally perpendicular of the extensions. The first or upper extension 30 is generally about 2" in length and includes a bore 36 adjacent its end.

The second or lower extension 32 is only about ¼" in length while connector 34 is about 2" long.

Engaging member 28 may be formed of metal or plastic material and may be cast or forged into shape. Engaging member 28 may be formed with a rigid core covered with a resilient material. The only requirement is that the forming material be sufficiently strong to retain its shape under pressure.

First ends of straps 24 and 26 are connected with the outer ends of first arms 30 by any suitable means, usually a flat brad or rivet. Second ends of straps 24, 26 are connected with buckle 38, with the end of first strap 24 being connected in fixed position and the end of second strap 26 being connected adjustably with the buckle.

Buckle 38 is of the usual construction commonly associated with seat belts for motor vehicles and is commercially available. Buckle 38 consists of clasp 40 and projection 42. Projection 42 includes an adjustable clamp 48.

Clasp 40 includes a usual receptacle and catch for receiving projection 42 and locking it in position. A release button 46 is provided which, when depressed, releases the projection and allows the clasp and projection to separate.

Clasp 40 and the second or inner end of strap 24 are connected in fixed position in usual manner. The inner or second end of strap 26 connects with projection 40 by way of an adjustable clamp 48. There is an excess length provided in strap 26 which allows its inner end to pass through clamp 48 and double back on itself as shown in FIGS. 1 and 3. Clamp 48 is operative to allow projection 42 to be adjusted lengthwise of strap 26 thus adjusting the effective length of belt 22.

Buckle 38, to include projection 42, clasp 40 and clamp 48, is commercially available and is manufactured by Beam Industrials.

In use, the driver parks the truck and prepares for sleep. Both doors 12 are in the closed position and locked. Safety device 20 is now positioned with an engaging member 28 located behind each arm rest 14 and through the opening between the arm rest and the inner side of door 12. The connector 34 is engaged with the arm rest. Buckle 38 is normally located substantially in the center of the cab and is engaged at this point. The extended end 50 of strap 26 is shifted longitudinally through clamp 48 until belt 22 is taut. Clamp 48 retains end 50 in this position until another adjustment is made. Buckle 38 maintains the strap in this position until release button 46 is activated releasing projection 42 from clasp 40 allowing belt 22 to separate.

The device can also operate with the doorframe of automobiles or other vehicles which do not have proper arm rests. Engaging members 28 are positioned with connector 34 engaged with the upper doorframe of opposing doors, the windows are raised to contact the rear side of the connector and to hold the engaging members in position, the buckle is engaged and the belt length adjusted until it becomes taut. The doors are now secured from inside the passenger area.

While a preferred embodiment of the invention has been described using specific terms, such description is for illustrative purposes only, and it is to be understood that changes and variations may be made without departing from the spirit or scope of the following claims.

What is claimed is:

1. A security device for locking spaced opposed doors of a motor vehicle in closed positions, said doors having arm rests secured with inner sides thereof, said security device comprising:

a pair of elongated flexible straps each having an arm rest engaging member at a first end and a releasable buckle at a second end;

said arm rest engaging member comprising a generally J-shaped member having spaced parallel first and second extensions and a generally perpendicular connecting member, said perpendicular member engaging between said arm rest and said inner side of said door with said first extension positioned on an upper side of said arm rest and said second extension positioned on a lower side of said arm rest;

said buckle includes a clasp connected with said second end of a first of said straps and a projection secured with said second end of a second of said straps, said projection being releasably engageable with said clasp when said buckle is engaged forming said pair of straps into a continuous strap between said doors;

an adjustment clamp for adjusting the combined length of said straps connected with one of said straps between said buckle and said engaging member; whereby, with each said arm rest engaging member positioned between said arm rest and an associated of said inner sides, and with said buckle engaged forming said straps continuous, said one of said straps is drawn through said adjustment clamp drawing said straps taut and locking said opposed doors in closed position.

2. The security member of claim 1 wherein each said second extension is less than ⅛ the length of said first extension and is positioned beneath the lower side of said arm rest.

3. The security member of claim 1 wherein said adjustment clamp is operative to allow lengthwise movement of said second strap when lengthening and shortening of said strap.

4. A method of securing opposed doors of a motor vehicle in closed positions comprising:

providing each said door have an arm rest which forms an opening between the door and the arm rest:

providing first and second elongated straps and securing a J-shaped engaging member with first ends of said straps, securing a clasp with a second end of said first strap and securing a projection with a second end of said second strap, said clasp and said projection forming a buckle and securing said projection within said clasp forming said straps continuous;

engaging one of said J-shaped members with each of said arm rests extending said continuous first and second straps between said doors;

providing an adjustment member with one of said first and second strap and adjusting the length of said first and second straps to be taut between said doors; thereby, securing said doors in said closed position.

5. The method of claim 4 including locating said buckle generally centrally between said doors when drawing said straps taut.

* * * * *